(12) United States Patent
Allen et al.

(10) Patent No.: US 6,947,248 B2
(45) Date of Patent: Sep. 20, 2005

(54) METHOD AND APPARATUS FOR WRITING WITH HEAD HAVING SPACED READ AND WRITE ELEMENTS

(75) Inventors: Gregory M. Allen, Layton, UT (US); Daniel D. Rochat, Ogden, UT (US)

(73) Assignee: Iomega Corporation, San Diego, CA (US)

( * ) Notice: Subject to any disclaimer, the term of this patent is extended or adjusted under 35 U.S.C. 154(b) by 123 days.

(21) Appl. No.: 10/612,810

(22) Filed: Jul. 1, 2003

(65) Prior Publication Data

US 2005/0002121 A1 Jan. 6, 2005

(51) Int. Cl.⁷ .............................................. G11B 5/596
(52) U.S. Cl. ............................................... 360/77.04
(58) Field of Search ............................ 360/77.04, 75, 360/77.02, 77.07, 77.08, 78.04

(56) References Cited

U.S. PATENT DOCUMENTS

| | | | | |
|---|---|---|---|---|
| 5,204,793 A | * | 4/1993 | Plonczak | 360/77.04 |
| 5,886,846 A | * | 3/1999 | Pham et al. | 360/77.04 |
| 6,493,175 B1 | * | 12/2002 | Carlson | 360/77.04 |
| 6,765,744 B2 | * | 7/2004 | Gomez et al. | 360/75 |
| 6,781,786 B2 | * | 8/2004 | Ishii | 360/78.04 |
| 2004/0080859 A1 | * | 4/2004 | Teo et al. | 360/77.02 |

* cited by examiner

*Primary Examiner*—David Hudspeth
*Assistant Examiner*—James L Habermehl
(74) *Attorney, Agent, or Firm*—James T. Hagler

(57) ABSTRACT

An apparatus includes a unit that uses a head with spaced read and write portions to write and read information to and from an information storage medium. According to one feature, a desired position for the write element is converted into a position for the read element as a function of a polynomial. According to another feature, the unit uses the head to write and read back selected information in order to determine compensation information, the receiving unit subsequently effecting writing of information with the head as a function of the compensation information. On a more specific level, the unit can removably receive a cartridge that contains the information storage medium.

29 Claims, 8 Drawing Sheets

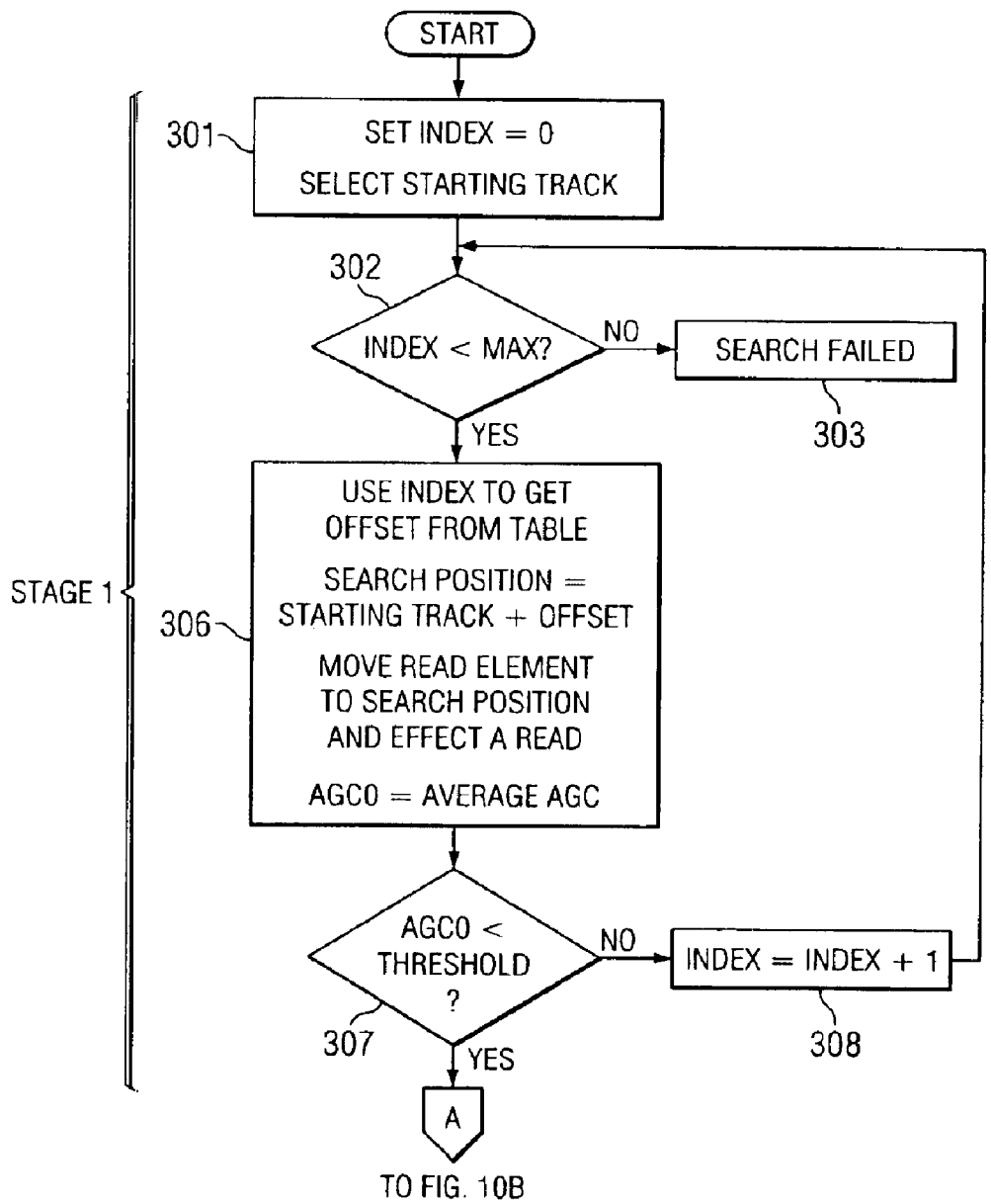

METHOD AND APPARATUS FOR WRITING WITH HEAD HAVING SPACED READ AND WRITE ELEMENTS

BACKGROUND OF THE INVENTION

Most computers include a disk drive which is used for data storage. The disk drive includes a rotatable disk having a magnetic coating on at least one side thereof. A read/write head is disposed adjacent the surface, and an actuator can move the read/write head approximately radially with respect to the surface, so that the head can write data to the surface and/or read data from the surface. The surface on the disk is conceptually divided into a plurality of concentric data tracks, which can each store data.

Early disk drives included a read/write head having a single read/write element, which was used both for writing data and reading data. However, there has been a progressively increasing demand for disk drives with significantly higher storage densities, and one result is that new types of heads have come into common use, examples of which include the magneto-resistive (MR) head, and the giant magneto-resistive (GMR) head. These MR and GMR heads typically have one element for writing data and a separate element for reading data, and these read and write elements are physically spaced from each other.

As is known in the art, a head can be positioned with respect to a disk by using feedback control based on servo information read from the disk with a read element of the head. In a head with spaced read and write elements, the read element is used to position the head relative to the disk not only for reading, but also for writing. One aspect of this is that, as the head is moved relative to the disk, the orientation of the read and write elements varies with respect to the tracks on the disk, such that the write element is typically aligned with a track that is different from the track with which the read element is aligned. Consequently, in order to correctly position the write element over a selected track for the purpose of writing data to that track, the read element must be positioned at a location which is radially offset from the selected track. This radial offset is referred to as a "microjog", and has a magnitude which varies as the head moves radially with respect to the disk. Techniques have been developed for calculating microjog values, and have been generally adequate for their intended purposes, but they have not been satisfactory in all respects.

As one aspect of this, there are existing disk drives in which the disk is rotatably supported in a removable cartridge, and in which the head is movably supported in a drive unit that can removably receive the cartridge. A given drive unit must be able to work with any of several similar and interchangeable cartridges, and any given cartridge must be capable of working in any of a number of compatible drive units. The removability of the cartridge introduces a number of real-world considerations into the system, and these considerations affect the accurate calculation of a microjog value.

For example, the cartridges have manufacturing tolerances which vary from cartridge. Thus, from cartridge to cartridge, there will be some variation relative to the cartridge housing of the exact position of the axis of rotation of the disk. As another example, two different cartridges may have slightly different mechanical seatings when they are inserted into the same drive unit. In fact, a given cartridge may experience different mechanical seatings on two successive insertions into the same drive unit. Real-world variations of this type cause small variations in the orientation of the read/write head with respect to the tracks on the disk, and thus affect accurate calculation of a microjog value.

In order to realize higher data storage densities in systems of the type which utilize removable cartridges, it is desirable to be able to use read/write heads that facilitate high storage densities, especially read/write heads that have spaced read and write elements, such as MR and GMR heads. However, due to real-world considerations of the type discussed above, accurate calculation of a microjog value has presented problems in the context of a removable cartridge. Accordingly, existing systems that use removable cartridges have continued to use read/write heads with a single read/write element, with the consequence that the storage capacities are significantly less than the storage capacities desired by consumers.

SUMMARY OF THE INVENTION

From the foregoing, it may be appreciated that a need has arisen for a method and apparatus for calculating microjog values in a manner that accommodates one or more read-world considerations. One form of the invention relates to a receiving unit having a cartridge receiving portion and having a head with spaced read and write portions, and involves: responding to insertion into the receiving portion of a cartridge having an information storage medium by moving the head adjacent and relative to the storage medium while using the head to write selected information to the storage medium and to then read back the selected information; using the selected information as read back with the head to determine compensation information relating to the spacing between the read and write portions; and subsequently effecting writing of information with the head as a function of the compensation information.

A different form of the invention relates to an apparatus which includes an information storage medium and a head with spaced read and write portions, and involves: converting, as a function of a polynomial, a desired position for the write portion into a corresponding position for the read portion which compensates for the spacing between the read and write portions; and thereafter positioning the head adjacent to the storage medium with the read portion at the corresponding position while writing information to the storage medium with the write portion.

Still another form of the invention relates to an apparatus which includes an information storage medium and a head with spaced read and write portions, and involves: moving the head adjacent and relative to the storage medium while using the head to write selected information to the storage medium and to read back the selected information; using the selected information as read back with the head to determine compensation information relating to the spacing between the read and write portions; and thereafter writing information to the storage medium with the head as a function of the compensation information.

BRIEF DESCRIPTION OF THE DRAWINGS

A better understanding of the present invention will be realized from the detailed description which follows, taken in conjunction with the accompanying drawings, in which.

DETAILED DESCRIPTION

Figure 1:
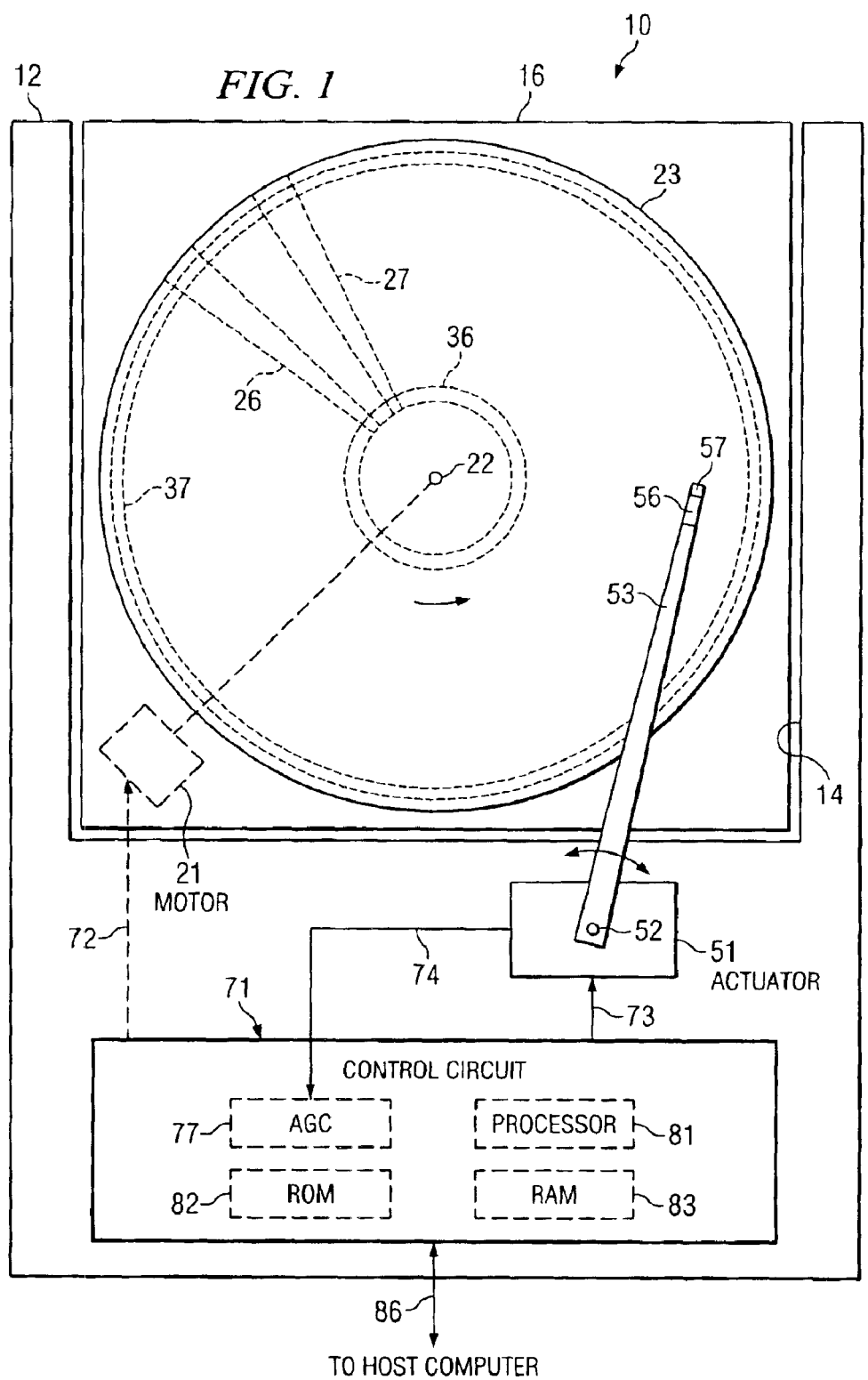
FIG. 1 is a diagrammatic view of an apparatus which is an information storage system that embodies aspects of the present invention.

FIG. 1 is a diagrammatic view of an apparatus which is an information storage system 10, and which embodies aspects of the present invention. The system 10 includes a receiving unit or drive 12 which has a recess 14, and includes a cartridge 16 which can be removably inserted into the recess 14.

The cartridge 16 has a housing, and has within the housing a motor 21 with a rotatable shaft 22. A disk 23 is fixedly mounted on the shaft 22 for rotation therewith. The side of the disk 23 which is visible in FIG. 1 is coated with a magnetic material of a known type, and serves as an information storage medium. This disk surface is conceptually divided into a plurality of concentric data tracks. In the disclosed embodiment, there are about 50,000 data tracks, not all of which are available for use in storing user data.

The disk surface is also conceptually configured to have a plurality of circumferentially spaced sectors, two of which are shown diagrammatically at 26 and 27. These sectors are sometimes referred to as servo wedges. The portions of the data tracks which fall within these sectors or servo wedges are not used to store data. Data is stored in the portions of the data tracks which are located between the servo wedges. The servo wedges are used to store servo information of a type which is known in the art. The servo information in the servo wedges conceptually defines a plurality of concentric servo tracks, which have a smaller width or pitch than the data tracks. In the disclosed embodiment, each servo track has a pitch or width that is approximately two-thirds of the pitch or width of a data track. Consequently, the disclosed disk 23 has about 73,000 servo tracks. The servo tracks effectively define the positions of the data tracks, in a manner known in the art.

Approximately 60 of the data tracks, which are the radially innermost tracks, are set aside as a first reserved area 36. Approximately 60 more data tracks, which are the radially outermost tracks, are set aside as a second reserved area 37. The reserved areas 36 and 37 are not available to store user data, but instead are used for a special purpose which is discussed later. User data is stored in the many data tracks that are disposed between the reserved areas 36 and 37 (except in the regions of the servo wedges).

The drive 12 includes an actuator 51 of a known type, such as a voice coil motor (VCM). The actuator 51 can effect limited pivotal movement of a pivot 52. An actuator arm 53 has one end fixedly secured to the pivot 52, and extends radially outwardly from the pivot 52. The housing of the cartridge 16 has an opening in one side thereof. When the cartridge 16 is removably disposed within the drive 12, the arm 53 extends through the opening in the housing, and into the interior of the cartridge 16. At the outer end of the arm 53 is a suspension 56 of a known type, which supports a read/write head 57. In the disclosed embodiment, the head 57 is a component of a known type, which is commonly referred to as a giant magneto-resistive (GMR) head. However, it could alternatively be some other type of head, such as a magneto-resistive (MR) head.

During normal operation, the head 57 is disposed adjacent the magnetic surface on the disk 23, and pivotal movement of the arm 53 causes the head 57 to move approximately radially with respect to the disk 23, within a range which includes the reserved areas 36 and 37. When the disk 23 is rotating at a normal operational speed, the rotation of the disk induces the formation between the disk surface and the head 57 of an air cushion, which is commonly known as an air bearing. Consequently, the head 57 floats on the air bearing while reading and writing information to and from the disk, without direct physical contact with the disk. However, the invention is not limited to systems in which the head is spaced from the disk by an air bearing, and can be used in systems where the head physically contacts the disk.

The drive 12 includes a control circuit 71, which is operationally coupled to the motor 21 in the cartridge 16, as shown diagrammatically at 72. The control circuit 71 selectively supplies power to the motor 21 and, when the motor 21 is receiving power, the motor 21 effects rotation of the disk 23. The control circuit 71 also provides control signals at 73 to the actuator 51, in order to control the pivotal position of the arm 53. At 74, the control circuit 71 receives an output signal from the head 57, which is commonly known as a channel signal. When the disk 23 is rotating, segments of servo information and data will alternately move past the head 57, and the channel signal at 74 will thus include alternating segments or bursts of servo information and data.

The control circuit 71 includes a channel circuit of a known type, which processes the channel signal received at 74. The channel circuit includes an automatic gain control (AGC) circuit, which is shown at 77. The AGC circuit 77 effect variation, in a known manner, of a gain factor that influences the amplitude of the channel signal 74. In particular, the AGC circuit uses a higher gain factor when the amplitude of the channel signal 74 is low, and uses a lower gain factor when the amplitude of the channel signal 74 is high. Consequently, the amplitude of the channel signal has less variation at the output of the AGC circuit 77 than at the input thereof.

The control circuit 71 also includes a processor 81 of a known type, as well as a read only memory (ROM) 82 and a random access memory (RAM) 83. The ROM 82 stores a program which is executed by the processor 81, and also stores data that does not change. The processor 81 uses the RAM 83 to store data or other information that changes dynamically during program execution.

The control circuit 71 of the drive 12 is coupled through a host interface 86 to a not-illustrated host computer. The host computer can send user data to the drive 12, which the drive 12 then stores on the disk 23 of the cartridge 16. The host computer can also request that the drive 12 read specified user data back from the disk 23, and the drive 12 then reads the specified user data and sends it to the host computer. In the disclosed embodiment, the host interface 86 conforms to an industry standard protocol which is commonly known as the Universal Serial Bus (USB) protocol, but could alternatively conform to any other suitable protocol, including but not limited to the IEEE 1394 protocol.

Figure 2:
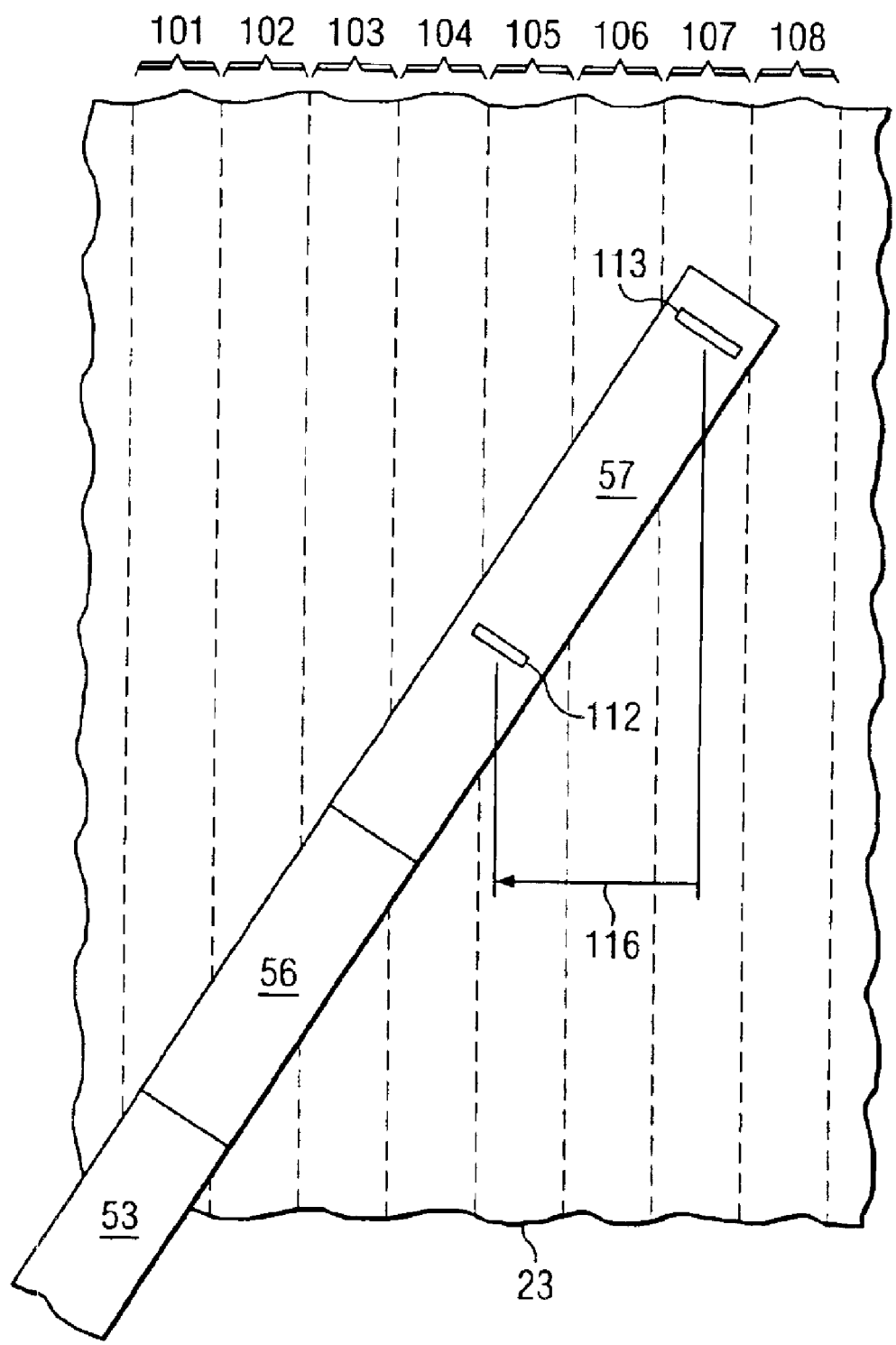
FIG. 2 is a fragmentary diagrammatic view which shows a portion of the system of FIG. 1 in a substantially enlarged scale.

FIG. 2 is a fragmentary diagrammatic view which shows, in a substantially enlarged scale, a portion of the structure of FIG. 1, including the head 57, the suspension 56, and portions of the arm 53 and disk 23. It should be understood that the depiction of all of these components is highly diagrammatic. Reference numerals 101–108 identify eight adjacent data tracks on the disk 23, which are close to but not within the reserved area 37 (FIG. 1). The tracks 101–108 are circular and concentric but, due to the degree of enlargement involved in FIG. 2, the curvature is sufficiently gradual that these tracks appear to be straight lines. The read/write head 57 has a read element 112 and a write element 113, which are shown diagrammatically, and which are spaced from each other. The write element 113 has a length which is somewhat longer than the length of the read element 112.

As the disk 23 rotates, segments of servo information and segments of data on the disk alternately move past the read element 112. The read element 112 produces the channel signal, which is supplied at 74 to the control circuit 71 (FIG. 1), and which includes alternating bursts of data and servo information. By analyzing the successive bursts of servo information received from the read element 112, the control circuit 71 can make an accurate determination of the current radial position of the read element 112. In particular, the control circuit 71 can use the servo information to accurately determine the radial position of the read element 112 with respect to the not-illustrated servo tracks. Since the positions of the data tracks are defined by the servo tracks, knowledge of the radial position of the read element 112 with respect to the servo tracks also constitutes knowledge of the radial position of the read element 112 with respect to the data tracks. Thus, in FIG. 2, the control circuit 71 knows from servo information read by the read element 112 that the read element 112 is currently disposed at a location straddling data tracks 104 and 105, with slightly more of the read element over track 105 than over track 104. Using this servo information read by the read element 112, the control circuit can effect feedback control to maintain the read element in a given radial position, or to radially reposition the read element 112.

Positioning the head 57 with respect to the disk 23 for the purpose of reading data is relatively straightforward, because the read element 112 is used both to read the data of interest and also to read the servo information which is used to position the read element 112. On the other hand, the write element 113 is used to write data to the disk 23, but does not read any information from the disk 23. Consequently, in order to write data to the disk 23, the write element 113 must be positioned indirectly, through the approach of positioning the read element 112 using the servo information which it is reading from the disk, and knowing where the write element 113 is in relation to the read element 112. A degree of complexity is introduced by the fact that the write element 113 is typically not aligned with the same data track as the read element 112. In fact, the radial position of the write element 113 in relation to the read element 112 is not a constant, but varies as the head 57 is moved radially of the disk.

In FIG. 2, for example, due to the angle of the actuator arm 53 with respect to the disk 23, the write element 113 is offset in a radial direction by approximately 2.33 data tracks from the read element 112. As explained above, there are 1.5 of the not-illustrated servo tracks for each illustrated data track, and so the offset can also be expressed as 2.33 data tracks×1.5=3.5 servo tracks. This radial offset, which is also referred to as a "microjog", is indicated diagrammatically at 116 by an arrow. Consequently, if the control circuit 71 wants to use the write element 113 to write data to the data track 107, the control circuit must use the servo information received through the read element 112 to accurately position the read element 112 so that it straddles data tracks 104 and 105 in the manner shown in FIG. 2, thereby centering the write element 113 over the data track 107 so that the write element can be used to write data to the data track 107.

Figure 3:
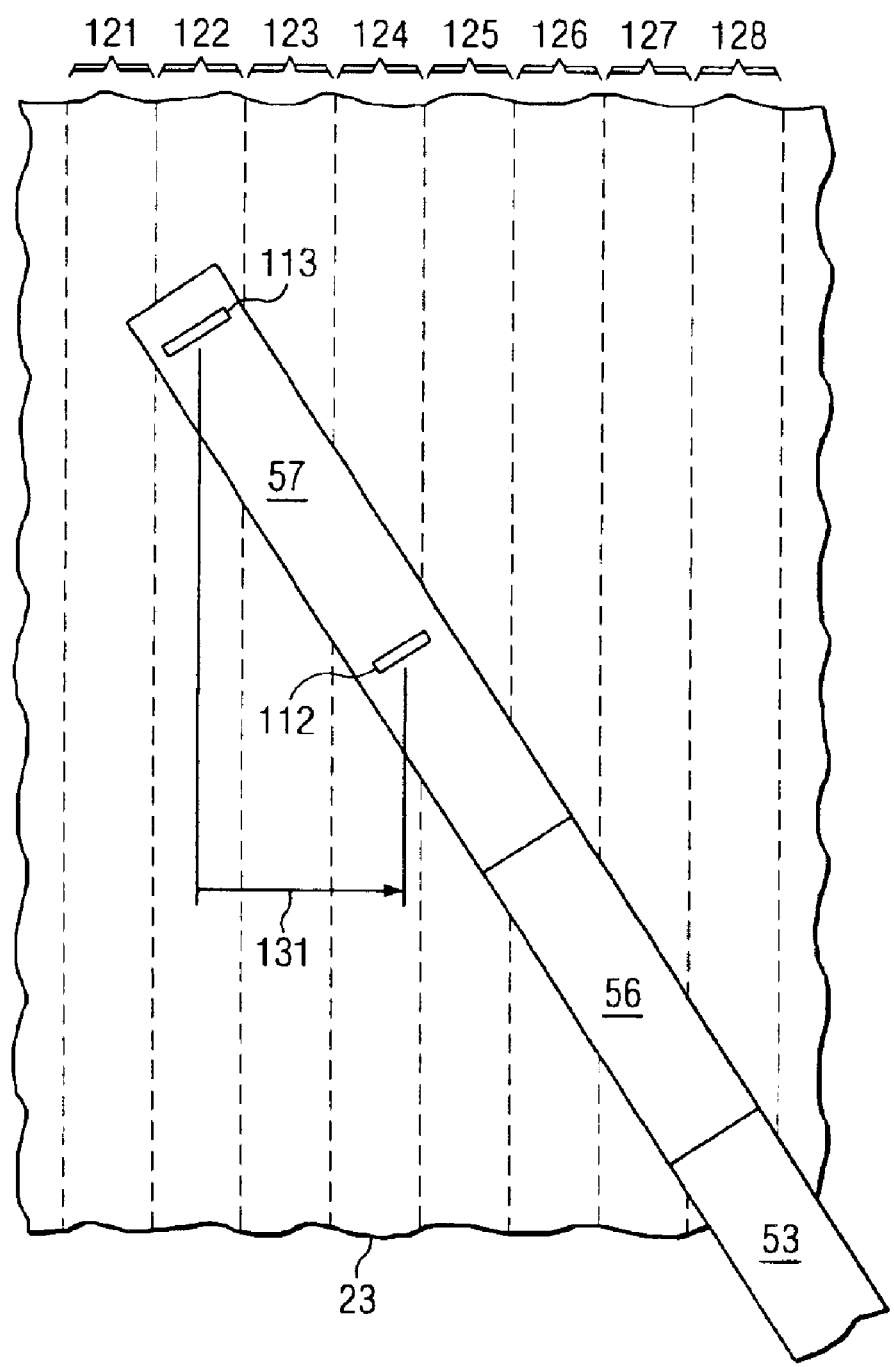
FIG. 3 is a fragmentary diagrammatic view similar to FIG. 2, but showing a different operational position.

FIG. 3 is a fragmentary diagrammatic view similar to FIG. 2, but showing a different operational position. In particular, the actuator arm 53 has been rotated counter-clockwise from the position shown in FIG. 2, so that in FIG. 3 the head 57 is near but not within the reserved area 36. FIG. 3 shows eight data tracks 121–128. It will be noted that the write element 113 is centered over the data track 122, and the read element 112 straddles the data tracks 124 and 125, with slightly more of the read element over the track 124 than the track 125. Thus, when the control circuit 71 wants to use the write element 113 to write data to the track 122, it uses servo information read by the read element 112 to accurately position the read element 112 so that the read element straddles the tracks 124–125 in the manner shown in FIG. 3.

In this situation, the read element 112 is offset by approximately 2.33 data tracks (3.5 servo tracks) from the write element 113, which is the microjog indicated by the arrow 131 in FIG. 3. However, it will be noted that the radial direction of the arrow 131 in FIG. 3 is opposite to the radial direction of the arrow 116 in FIG. 2. Stated differently, in order to position the write element 113 over the track 107 in FIG. 2, the control circuit 71 must position the read element 112 so that it is disposed 2.33 data tracks (3.5 servo tracks) in a direction radially inwardly from the track 107. In contrast, in order to position the write element 113 over the track 122 in FIG. 3, the control circuit 71 must position the read element 112 so that it is disposed 2.33 data tracks (3.5 servo tracks) in a direction radially outwardly from the track 122.

Figure 4:
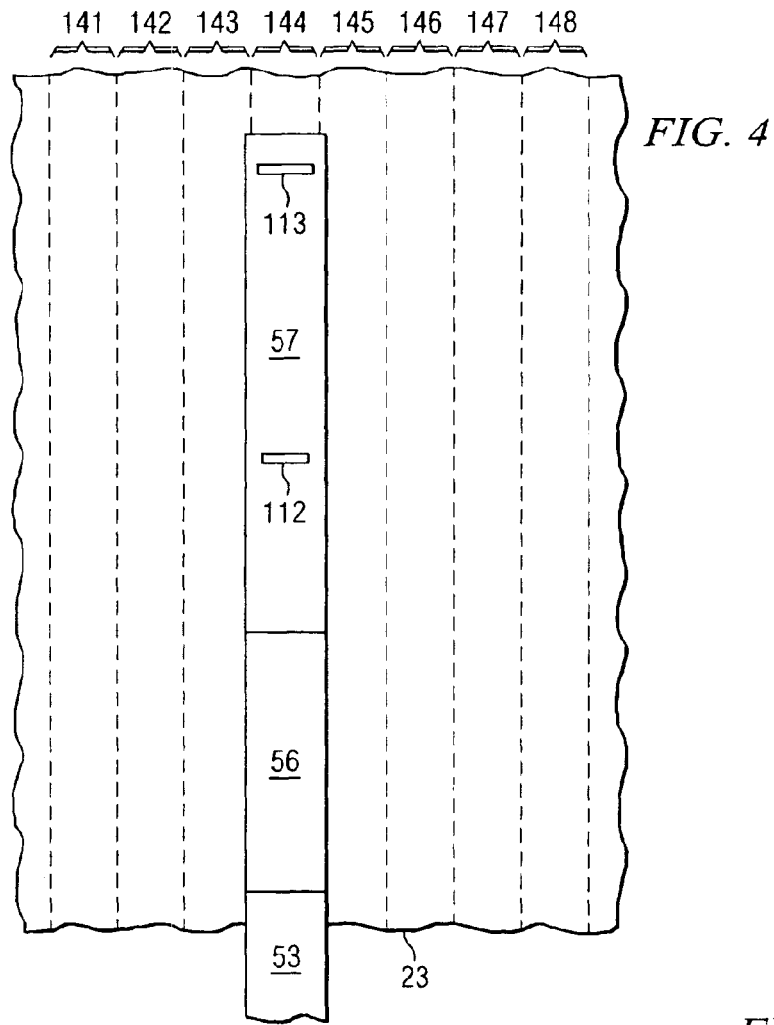
FIG. 4 is a fragmentary diagrammatic view similar to FIGS. 2 and 3, but showing still another operational position.

FIG. 4 is a fragmentary diagrammatic view similar to FIGS. 2 and 3, but showing yet another operational position. In FIG. 4, the actuator arm 53 is disposed approximately halfway between the positions shown in FIGS. 2 and 3. FIG. 4 shows eight data tracks 141-148. The read element 112 and the write element 113 are both relatively accurately centered over the same data track 144. Thus, in FIG. 4, the microjog value is zero, because the read element 112 does not need to be positioned with an offset from the track 144 in order to center the write element 113 over the track 144. Stated differently, if the read element 112 is radially centered over the track 144, the write element will also be radially centered over the track 144.

With reference to FIGS. 2–4, it will be noted that, as the actuator arm 53 is pivoted and moves the head 57 radially across the disk, the appropriate microjog value varies progressively from a positive value through zero to a negative value. This is due in part to the spacing between the read element 112 and the write element 113, and is also due in part to the fact that there is variation in the angle of the read and write elements with respect to the tracks on the disk as the head is moved radially with respect to the disk. Consequently, when the write element 113 is to be used to write data to any given data track, an appropriate microjog value must be determined for that data track in order to know where to position the read element 112 while that write operation is carried out.

As discussed above in association with FIG. 1, the cartridge 16 can be removed from the drive 12. In fact, the drive 12 is designed with the intent that any one of a number of similar cartridges can be interchangeably inserted into the drive 12, and that the drive 12 will work reliably and accurately with any of the cartridges. The removability of the cartridge 16 introduces additional considerations into the determination of an appropriate microjog value, because there will be factors that vary from cartridge to cartridge, and factors that vary from insertion to insertion. For example, there will be mechanical tolerances involved in how different cartridges seat within the recess 14 within the drive 12. In fact, if a given cartridge is disposed in the drive 12, and is then removed and reinserted, the mechanical seating may change somewhat. If that cartridge is then removed and replaced with a different cartridge, the replacement cartridge may seat differently than the original cartridge. Consequently, the exact position of the disk with respect to the head may vary from one cartridge insertion to another, for either the same or different cartridges.

Further, internal variations can exist from cartridge to cartridge. For example, due to mechanical tolerances, the physical location of the motor shaft 22 with respect to the housing of its cartridge may be slightly different in one cartridge as compared to another cartridge. These tolerance and/or seating variations can cause variation in the distance between the motor spindle 22 and the actuator pivot 52, which in turn can affect the appropriate microjog value.

A further consideration is that the servo information on the disk in one cartridge may have been written to the disk at the factory by one servo-writer machine, while the servo information on the disk in a different cartridge may have been written by a different servo-writer machine. As a result, each track on one disk may not be in precisely the same radial location as the equivalent track on another disk.

Yet another consideration is that the foregoing discussion has focused on how a particular drive must be able to accurately and reliably work with any of a number of different cartridges, but the converse is also true. In particular, a given cartridge must be able to reliably and accurately work in a number of different drives.

Still another consideration is that the spacing between and orientation of the read and write elements 112 and 113 may vary from head to head (and thus from drive to drive), for example due to process variations involved in manufacturing the head. In order to be able to use exactly the same firmware program for the processor 81 in each drive 12, without customization for each drive, the firmware must be capable of accommodating real-world variations such as variations from one read/write head to another.

Consequently, in the context of a removable cartridge, there are a variety of factors, including those discussed above, which can affect proper calculation of an accurate microjog value. One feature of the present invention relates to techniques that allow accurate determination of a micro-jog value, despite factors of this type. These techniques for accurately calculating microjog are explained in detail below. First, however, an overview is provided.

In particular, with reference to FIG. 1, the control circuit 71 of the drive 12 responds to insertion of a cartridge 16 by erasing data in at least part of the reserved area 36, and then positioning the write element 113 approximately over a central portion of the reserved area 36, using servo information read by the read element 112. The control circuit 71 then uses the write element 113 to write some predetermined data in the reserved area 36. The control circuit 71 then moves the head 57 radially while searching for this data with the read element 112, until the control circuit 71 determines a radial position in which the read element 112 would be radially centered over this data. Based on servo information read by the read element 112 while the data is being written, and also servo information read by the read element 112 while the same data is later being read, the control circuit 71 knows the exact radial position of the read element 112 when the data was being written, and the exact radial position of the read element 112 when the data was being read. The control circuit 71 can then take the difference between these two positions, in order to accurately determine an actual microjog value for one specific data track within the reserved area 36.

The control circuit 71 then carries out a similar sequence of operations for the other reserved area 37. This results in a very accurate determination of an actual microjog value for one specific data track within the reserved area 37. The information obtained in this manner, which includes the two actual microjog values, serves as compensation information that is specific to the particular cartridge 16 that has been inserted into the drive 12, and the particular current seating of that cartridge.

Thereafter, when the control circuit 71 needs to write data to a selected data track on the disk 23, it carries out a two-step procedure. First, it uses a predetermined translation technique, which is independent of the particular cartridge and its present seating, to determine a nominal or ideal microjog value for the selected track. Second, the control circuit 71 uses the compensation information to adjust the nominal microjog value, in order to obtain an actual microjog value which accurately takes into account the particular cartridge and its current seating, thereby permitting the write element 113 of the head 57 to be accurately positioned over the selected track. The specific manner in which this is all carried out will now be described in greater detail.

Figure 5:
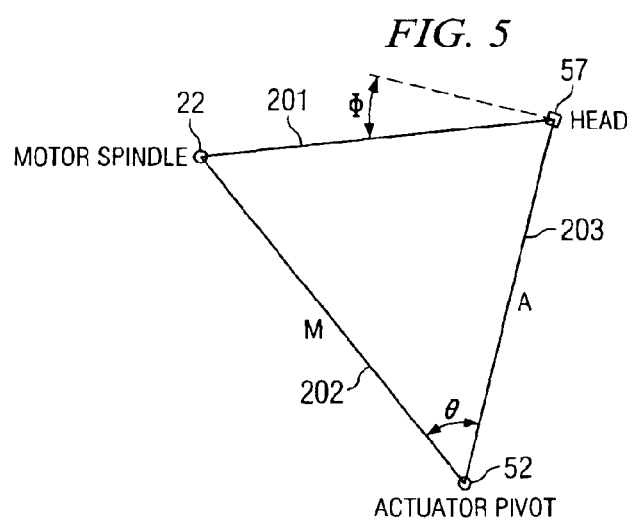
FIG. 5 is a diagrammatic view showing a geometric relationship between selected elements of the system of FIG. 1.

FIG. 5 is a diagrammatic view of selected components from the system of FIG. 1, including the motor spindle 22, the actuator pivot 52, and the head 57. Line 201 extends radially from the motor pivot 22 to the head 57. Line 202 extends radially between the motor spindle 22 and the actuator pivot 52, and has a length M. Line 203, which corresponds conceptually to the actuator arm 53, extends radially from the actuator pivot 52 to the write element 113 on the head 57, and has a length A. The angle between the lines 202 and 203 is identified by $\theta$. The angle formed by the line 201 with the read and write elements is identified by $\phi$, and can be referred to as head skew angle. It will be noted that the angles $\theta$ and $\phi$ are not constant, but vary as the arm 53 is pivoted by the actuator 51 to move the head 57 toward or away from the motor spindle 22 in FIG. 5.

Figure 6:
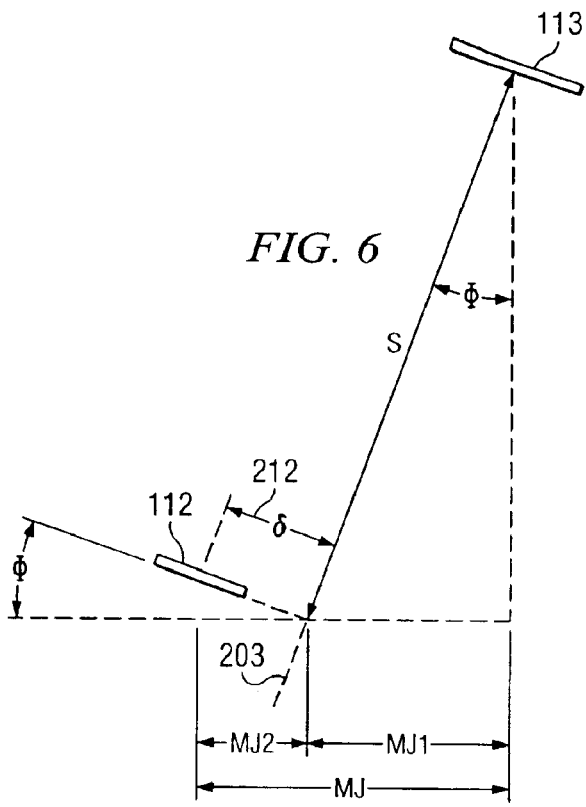
FIG. 6 is a diagrammatic view showing different geometric relationships involving other elements of the system of FIG. 1.

FIG. 6 is a diagrammatic view showing the read and write elements 112 and 113 of the head 57. As mentioned above, line 203 extends radially from the actuator pivot 52 to the write element 113, and in particular to the center of the write element 113. The distance between the read element 112 and the write element 113, in a direction parallel to the line 203, is a distance S which is identified in FIG. 6 by a double-headed arrow.

In FIG. 6, the center of the read element 112 is depicted as being laterally offset from the line 203 by a distance δ, which is identified by reference numeral 212. The head 57 in the disclosed embodiment is designed so that, in theory, the read element 112 should have its center disposed on the line 203, such that δ=0. However, the offset δ is depicted in FIG. 6 because, due to practical considerations such as manufacturing process variations, the read element 112 may not actually be centered accurately on the line 203. In FIG. 6, the total microjog amount is indicated at MJ, and is made up of two portions, which are respectively MJ1 and MJ2. Using standard trignometric principles, MJ1 and MJ2 can be expressed as:

$$MJ1 = S \cdot \sin(\phi)$$

$$MJ2 = \delta \cdot \cos(\phi)$$

Consequently, the microjog amount MJ can be expressed as:

$$MJ = MJ1 + MJ2$$
$$= S \cdot \sin(\phi) + \delta \cdot \cos(\phi)$$

The microjog amount MJ can be normalized with absolute dimensions to the track pitch TP of the servo tracks, thereby yielding a microjog distance MJD in servo tracks, as follows:

$$MJD = \frac{S \cdot \sin(\phi) + \delta \cdot \cos(\phi)}{\cos(\phi) \cdot TP} \quad (1)$$
$$= \frac{S \cdot \tan(\phi) + \delta}{TP}$$

With reference to FIG. 5, it can be shown with trigonometry that:

$$\tan(\phi) = \frac{\frac{A}{M} - \cos(\theta)}{\sin(\theta)} \quad (2)$$

Inserting Equation (2) into Equation (1) yields:

$$MJD_{nom}(\text{track}) = \frac{S \cdot \left( \frac{\frac{A}{M} - \cos(\theta(\text{track}))}{\sin(\theta(\text{track}))} \right) + \delta}{TP} \quad (3)$$

Given a particular value of the angle θ, which corresponds to a particular data track and an associated servo track, Equation (3) can be used to determine the nominal or ideal microjog distance in servo tracks ($MJD_{nom}$), which is the radial offset in servo tracks that the read element 112 must have from the selected data track in order to center the write element 113 over the selected data track. Equation (3) basically represents circumstances in an ideal system that is not subject to various real-world factors of the type discussed above, such as those relating to removability. The exception is the presence in Equation (3) of δ, which in an ideal system would be zero.

Figure 7:
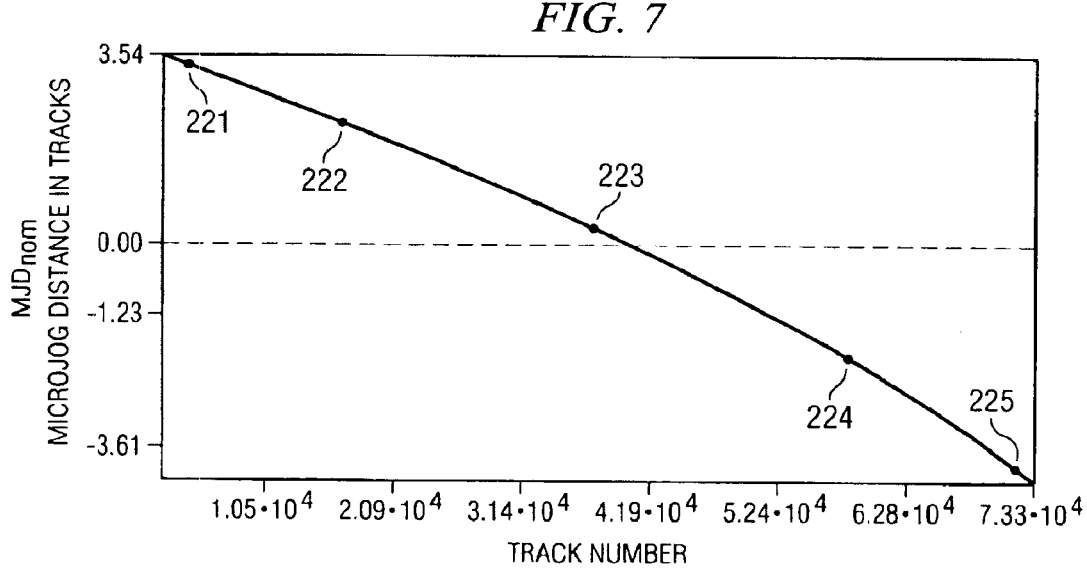
FIG. 7 is a graph showing how a nominal microjog value varies as a read/write head is moved radially with respect to a disk, where the head and disk are components of the system of FIG. 1.

FIG. 7 is a graph showing a curve which corresponds to Equation (3), where it is assumed that δ equals zero. In FIG. 7, the horizontal axis represents servo track numbers, but it will be recognized that each servo track has a corresponding value of θ. The vertical axis is the nominal microjog distance $MJD_{nom}$ obtained by solving Equation (3). As discussed above in association with FIGS. 2–4, the microjog distance varies from a positive value through zero to a negative value as the head 57 is moved radially across the portion of the disk 23 which can store information. Noting that the horizontal broken line in FIG. 7 represents a microjog value of zero, and that the horizontal axis represents a direction extending radially of the disk, it can be clearly seen that, as mentioned above, the microjog value varies from a positive value through zero to a negative value in a direction radially of the disk.

It would be possible for the drive 12 of FIG. 1 to determine a nominal microjog value by solving Equation (3) each time that it needed to access a track on the disk. However, solving the trignometric sine and cosine functions in Equation (3), along with the mathematical division operations, can be relatively time-consuming for a processor such as that shown at 81 in FIG. 1. Therefore, for speed and efficiency, the drive 12 of FIG. 1 does not solve Equation (3) each time that it needs to access the disk. Instead, the drive 12 solves a polynomial equation which is discussed in more detail below, and which defines a curve that closely approximates the curve shown in FIG. 7. This polynomial is developed directly from the curve shown in FIG. 7, in the following manner.

First, five points 221–225 are picked at arbitrary locations along the curve of FIG. 7. The outermost points 221 and 225 are intentionally selected to be relatively close to the respective ends of the curve, and the three remaining points 222–224 are selected at spaced locations between the points 221 and 225. The five points 221–225 could be selected so that the space between each adjacent pair of points is uniform, but in FIG. 7 they have been selected to have non-uniform spacing, in order to make it clear that the spacing does not have to be uniform. The points 221–225 in FIG. 7 happen to correspond to servo tracks 3764, 16709, 37655, 58601 and 71546 in the disclosed embodiment.

The number of points selected could be more or less than five. As the number of points is progressively increased, the accuracy of the resulting polynomial will progressively increase. On the other hand, as the number of points is progressively increased, the complexity of the polynomial and the time required to solve it will also increase. In the disclosed embodiment, the number of points has been selected to be five, representing a suitable balance between accuracy and efficiency.

Each of the five points 221–225 in FIG. 7 can effectively be represented by a two-dimensional Cartesian coordinate pair (x, y), where the x value is the corresponding track number along the horizontal axis, and the y value is the corresponding microjog distance in servo tracks along the vertical axis. If the Cartesian coordinates for the five points 221–225 are respectively ($x_0$, $y_0$), ($x_1$ $y_1$), ($x_2$ $y_2$), ($x_3$ $y_3$), and ($x_4$ $y_4$), then the x and y values for each point 221–225 can be separately inserted into a standard polynomial equation, in order to obtain five versions of the equation which each correspond to a respective one of the points 221–225. In particular, the standard polynomial used here is:

$$y = a_4(x)^4 + a_3(x)^3 + a_2(x)^2 + a_1(x) + a_0 \quad (4)$$

In Equation (4), $a_4$, $a_3$, $a_2$, $a_1$ and $a_0$ are respective different coefficients, each of which is a constant. If each coordinate pair is separately inserted into Equation (4), the result is five equations which each correspond to a respective one of the points 221–225, as follows:

$$y_0=a_4(x_0)^4+a_3(x_0)^3+a_2(x_0)^2+a_1(x_0)+a_0$$

$$y_1=a_4(x_1)^4+a_3(x_1)^3+a_2(x_1)^2+a_1(x_1)+a_0$$

$$y_2=a_4(x_2)^4+a_3(x_2)^3+a_2(x_2)^2+a_1(x_2)+a_0$$

$$y_3=a_4(x_3)^4+a_3(x_3)^3+a_2(x_3)^2+a_1(x_3)+a_0$$

$$y_4=a_4(x_4)^4+a_3(x_4)^3+a_2(x_4)^2+a_1(x_4)+a_0$$

Since there are five equations having the same five coefficients, the five equations can be solved in a known manner in order to determine the five coefficients. In the disclosed embodiment, for the specific curve shown in FIG. 7, this resulted in the following five coefficients:

$$a_4 = -6.7841 \times 10^{-20}$$

$$a_3 = 3.6481 \times 10^{-15}$$

$$a_2 = -2.9071 \times 10^{-10}$$

$$a_1 = -7.8931 \times 10^{-5}$$

$$a_0 = 3.6988$$

Once these five coefficients have been determined in this manner, they can be inserted into Equation (4), thereby yielding a polynomial which represents a curve that approximates the curve shown in FIG. 7. The curve defined by Equation (4) will necessarily extend through each of the points 221–225 in FIG. 7. Between these points, it will typically be spaced slightly from the curve shown in FIG. 7, which represents a degree of error.

Figure 8:
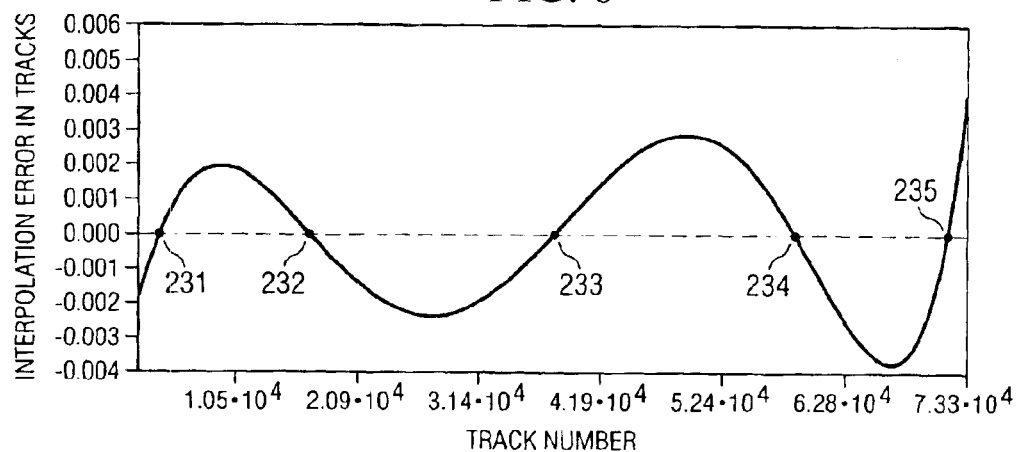
FIG. 8 is a graph showing an error curve representing a difference between the curve of FIG. 7 and an approximation of that curve.

FIG. 8 is a graph showing a curve representing this error, or in other words the difference between the curve of FIG. 7 and the curve obtained from Equation (4) when using the specific coefficients set forth above. In FIG. 8, the track number is shown on the horizontal axis, and the difference between the two curves is shown on the vertical axis as an interpolation error. It will be noted that the error curve of FIG. 8 has five zero crossings at points 231–235, which each correspond directly to a respective one of the points 221–225 in FIG. 7. It will also be noted that the peaks of the error curve are not equal in amplitude. In this regard, the error shown in FIG. 8 has its largest amplitude at the right endpoint of the curve, a relatively large peak amplitude between the zero crossing points 234 and 235, and a smaller peak amplitude between the zero crossing points 231–232.

If the point 235 were to be moved slightly to the right, it would inherently have the effect of reducing the amplitude of the error at the right endpoint of the curve. If the point 234 were to be moved rightwardly so as to slightly reduce the distance between points 234 and 235, it would reduce the amplitude of the error peak disposed between points 234 and 235. The points 232 and 233 could each be moved rightwardly a small amount, but with a slight increase in the distance between them, thereby allowing the amplitude of the error peak between points 231 and 232 to increase slightly, while avoiding a significant change in either of the error peaks between points 232 and 234. As a result, the amplitudes of the error peaks could all be balanced, so that they each have approximately the same amplitude. Adjustment of the position of the points 231–235 can be effected manually, but it would alternatively be possible to use commercially available software programs that have the capability to automate this type of optimization.

It will be recognized that moving one or more of the points 231–235 in FIG. 8 effectively means that equivalent movement is effected for one or more of the corresponding points 221–225 along the curve of FIG. 7. In the specific example being discussed here, the indicated movement of the points 231–235 to balance error peaks resulted in corresponding movement of the points 221–225 away from the positions shown in FIG. 7, to new positions respectively corresponding to servo tracks 4010, 18458, 40458, 60519 and 71834.

Of course, repositioning each of the points 221–225 along the curve of FIG. 7 produced corresponding new values for each of the five Cartesian coordinate pairs $(x_0, y_0)$, $(X_1, y_1)$, $(x_2, y_2)$, $(x_3, y_3)$, and $(x_4, y_4)$. These new Cartesian coordinate pairs were then separately substituted into Equation (4), resulting in five new versions of that polynomial, which were then solved in the manner discussed above in order to obtain respective updated values for the five coefficients, which are:

$$a_4 = -7.3459 \times 10^{-20}$$

$$a_3 = 4.4802 \times 10^{-15}$$

$$a_2 = -3.3010 \times 10^{-10}$$

$$a_1 = -7.8302 \times 10^{-5}$$

$$a_0 = 3.6966$$

Figure 9:
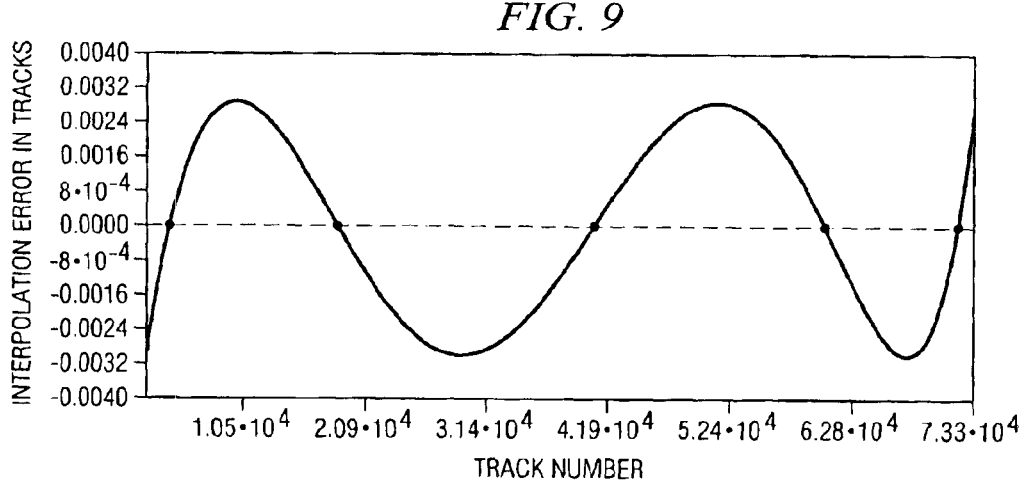
FIG. 9 is a graph similar to FIG. 8, but showing an error curve representing a difference between the curve of FIG. 7 and a different approximation of that curve.

These five updated coefficients were then substituted into Equation (4), in order to obtain a new version of that polynomial. FIG. 9 is a graph similar to FIG. 8, but showing an error curve which represents the difference between the curve shown in FIG. 7, and the curve obtained with Equation (4) using the five updated coefficients. It will be noted that the peaks of this error curve all have approximately the same amplitude. Thus, the polynomial of Equation (4) with the updated coefficients has relatively optimum accuracy for a polynomial based on five points 221–225. In order to achieve a significantly higher degree of accuracy, it would be necessary to select more than five points along the curve of FIG. 7, and to use a polynomial of correspondingly higher order.

Recognizing that x in Equation (4) represents track number, and y represents the microjog distance, Equation (4) can be rewritten in the following manner, where the coefficients $a_4$ through $a_0$ are the updated coefficients just discussed:

$$MJD_{nom}(\text{track}) = a_4(\text{track})^4 + a_3(\text{track})^3 + a_2(\text{track})^2 + a_1(\text{track}) + a_0 \quad (5)$$

Equation (5) yields for any given track the nominal or ideal microjog value, which ignores various real-world considerations that can affect the microjog value, including the real-world considerations discussed above which relate to the fact that the cartridge 16 in FIG. 1 is a removable component that is interchangeable with other similar cartridges. In order to accommodate these various real-world considerations, the drive 12 of FIG. 1 makes a compensating adjustment to the nominal microjog value obtained using Equation (5). This compensating adjustment is expressed mathematically by the following equation:

$$MJD_{actual}(\text{track}) = b(MJD_{nom}(\text{track})) + c \quad (6)$$

where "b" is a scaling value which is multiplied by the nominal microjog value obtained from Equation (5), and where "c" is an offset value which is added to the result of the multiplication. It will be noted that the coefficient b essentially effects a change in the slope of the curve represented by Equation (5), and that coefficient c essentially effects either a positive or negative vertical offset of the entire curve.

It is helpful to understand that Equation (5), including its coefficients, is determined during system design, and is then embedded in the firmware program which is stored in the ROM 82 (FIG. 1), and which is executed by the processor 81. In other words, for a given design version of the drive 12 and the cartridge 16, Equation (5) does not vary from drive to drive or from cartridge to cartridge. In contrast, the coefficients b and c used in Equation (6) are determined separately by the drive 12 of FIG. 1 each time that a cartridge 16 is inserted into that drive, in order to allow for factors which vary from cartridge to cartridge, variations in cartridge seating, and so forth.

A further consideration is that, in the disclosed embodiment, Equation (6) is a polynomial having a linear term and a constant term, and thus two coefficients. It would alternatively be possible to use some other equation, such as a higher order polynomial having at a quadratic term, a linear term and a constant term, and thus three coefficients.

As discussed earlier, each time that a cartridge 16 is inserted into the drive 12, the control circuit 71 writes and reads data from each of the two reserved areas 36 and 37 in FIG. 1, which are respectively at the inside diameter (ID) and the outside diameter (OD) of the tracks present on the disk. As also discussed above, this allows the control circuit 71 to measure an actual microjog distance for one track which is located near the ID of the range of tracks, and to measure another actual microjog value for a different track which is located near the OD of the range of tracks. These two actual microjog values are respectively identified here as $MJD_{meas\_id}$ and $MJD_{meas\_od}$. For each of these two specific tracks, the control circuit 71 can use Equation (5) to calculate a respective nominal microjog value, and these two nominal microjog values are respectively identified here as $MJD_{nom}(\text{track}_{id})$ and $MJD_{nom}(\text{track}_{od})$. Each nominal value and the corresponding measured value can be substituted into Equation (6), thereby yielding the following two equations:

$$MJD_{meas\_id} = b \cdot MJD_{nom}(\text{track}_{id}) + c$$

$$MJD_{meas\_od} = b \cdot MJD_{nom}(\text{track}_{od}) + c$$

These two equations can then be solved in order to determine the two coefficients b and c. It will be recognized that new values for b and c will be calculated by the control circuit 71 each time that a cartridge 16 is inserted into the drive 12. These new values of b and c are then substituted into Equation (6), and Equation (6) is then used in this form to determine microjog values, until that particular cartridge is ejected from the drive 12. If the cartridge 12 is left in the drive 12 for a relatively long period of time, the drive 12 could periodically calculate new values for the coeffients b and c, without waiting for the cartridge to be ejected. By using Equation (6), the drive 12 can accurately determine an appropriate microjog value for the disk in a given cartridge, notwithstanding real-world considerations such as tolerance variations between different cartridges, variations in mechanical seating from one cartridge insertion to the next, and so forth.

As discussed above, each time that a cartridge 16 is inserted into the drive 12, the drive 12 writes data to and then reads that data back from each of the reserved areas 36 and 37. The manner in which this is carried out will now be described in more detail. In this regard, the drive 12 does essentially the same thing in each of the reserved areas 36 and 37. Therefore, for convenience, the following discussion explains what happens in one of the reserved areas, which is the reserved area 36. First the control circuit 71 erases a predetermined number of adjacent data tracks in approximately the radial center of the reserved area 36. Then, the control circuit 71 uses servo information obtained through the read element 112 to position the read element 112 over a predetermined track, which is selected so that the write element 113 will be approximately radially centered within the region which was just erased. The control circuit then uses the write element 113 to write data to the reserved area 36.

Next, the control circuit 71 uses the read element 112 to search the reserved area 36 for the data that that was just written with the write element, recognizing that the read element 112 will have to be moved to a different radial position in order to be disposed over that data. In a direction radially of the disk, the magnetic information representing the data will tend to have a peak at the radial center of the data, and this magnetic field will drop off on either side of the peak in the shape of approximately a "bell" curve. Consequently, the control circuit 71 moves the read element 112 radially in a search pattern, attempting to locate the data it has written and, more specifically, attempting to locate the peak of the magnetic field for this data. The manner in which this search is carried out is described below, with reference to FIG. 10.

Figure 10B:
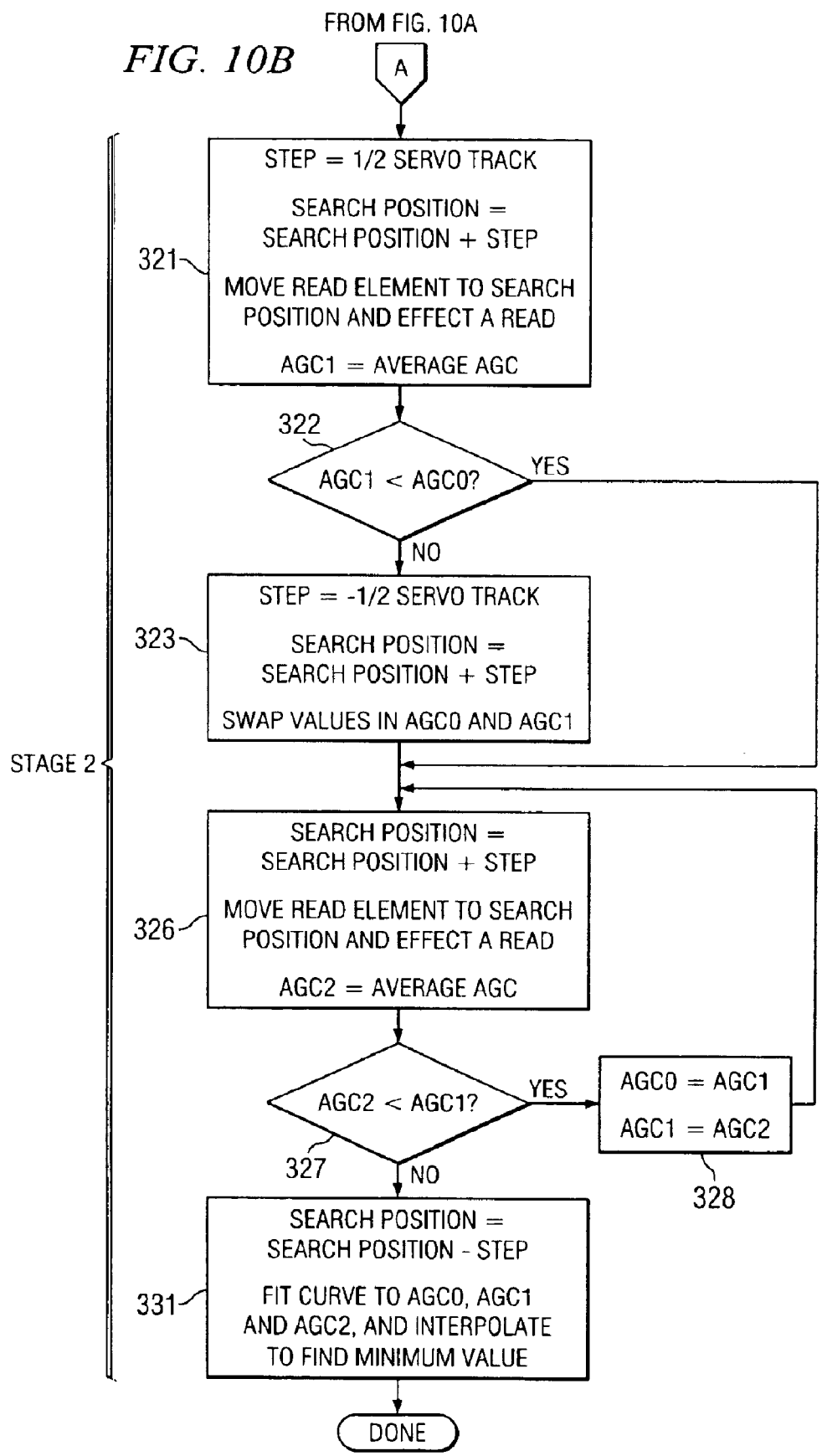
FIG. 10 is a flowchart showing a sequence used to search for data which has been written to the disk in the system of FIG. 1.

FIG. 10 is a flowchart showing a sequence of operations which is carried out by the control circuit 71, in order to search for the data that has been written into the reserved area 36. As indicated along the left side of FIG. 10, the search includes two stages. The first stage involves a somewhat course search, the object of which is to locate the data. The second stage involves a search with higher resolution, for the purpose of locating the peak of the magnetic field of the data.

In FIG. 10, the first stage of the search begins at block 301, where a variable INDEX is set to zero, and where a starting track is selected. The starting track represents the radial location at which the data would mostly likely have been written if the system was ideal in its structure and operation. Of course, due to real-world considerations that affect the actual microjog distance, the data may actually been written along a different track, which is offset radially inwardly or radially outwardly from the starting track.

In the first stage of the search, the control circuit 71 will position the read element 112 on the starting track, and look for the data along the starting track. If the data is not found there, the control circuit 71 will move outwardly from the starting track in both radial directions, alternately moving the read element 112 from one side of the starting track to the other side thereof, while progressively increasing the radial distance between the read element 112 and the starting track.

In more detail, with reference to block 302, the control circuit 71 verifies that the current value of the variable INDEX is less than a predetermined maximum value. If it is not, then control proceeds to block 303, where the search is terminated due to a failure to find the data within the region where it should be present. This would likely cause the host computer to present the user with an error message indicating that there is a problem with the current cartridge. However, it would be very rare for a search to be terminated in this manner. Instead, with reference to block 302, the control circuit will typically determine in block 302 that the value in INDEX is less than the maximum value, such that control will proceed to block 306. In block 306, the value in INDEX is used as an index to a table which is shown here as TABLE 1, in order to get from the table a corresponding track offset (in servo tracks).

TABLE 1

| INDEX | TRACK OFFSET |
|---|---|
| 0 | 0 |
| 1 | 1 |
| 2 | −1 |
| 3 | 2 |
| 4 | −2 |
| 5 | 3 |
| 6 | −3 |
| . | . |
| . | . |
| . | . |

With reference to Table 1, it will be noted that, as the value in INDEX is progressively increased from zero, the track offset is initially zero, and then alternates between positive and negative integers which progressively increase. With reference to block 306, a track offset (in servo tracks) from the table is added to the selected starting track, in order to obtain a search position or search track. The read element 112 is then moved radially to the search position, and is used to effect a read. Thus, during the first pass through block 306, the track offset will be zero and the search will occur at the starting track. During subsequent passes through the block 306, searching will be successively effected in an adjacent track on a first side of the starting track, then in an adjacent track on the opposite side of the starting track, then in the second track from the starting track on the first side, and so forth.

As discussed above in association with FIG. 1, the channel signal 74 from the read element 112 passes through an automatic gain control (AGC) circuit 77, which applies a gain factor that varies inversely with the amplitude of the magnetic information being read from the disk. The search routine of FIG. 10 monitors the AGC gain factor as it attempts to locate the peak of the magnetic field of the data which was written to the disk. Thus, in looking for the peak of the magnetic field, the routine is actually looking for an inverse peak or a minimum value of the AGC gain factor. When the read element 112 is in a particular radial search position, the control circuit 71 reads the AGC gain factor 120 times during one revolution of the disk 23, where each such reading is taken when the read element 112 is reading data rather than servo information. The control circuit 71 then adds up these 120 readings and divides by 120, in order to obtain an average AGC gain factor for that radial search position. In block 306, this average AGC value is stored in a variable AGC0.

Control then proceeds to block 307. If the value in the variable AGC0 is greater than a threshold value, it means that the detected magnetic field at the current search position is minimal, and that the data has not yet been detected. Accordingly, control proceeds to block 308, where the value in the variable INDEX is incremented. Control then returns to block 302, to effect a search at a new search position.

On the other hand, with reference to block 307, if the read element 112 is detecting the data of interest, then the amplitude of the channel signal at 74 will be sufficiently high so that the AGC gain factor will be relatively low. Consequently, the value in AGC0, which is an average AGC gain factor, will be determined to be less than the threshold. This means that the first stage of the search has been completed, because the data has been located. Control then proceeds to block 321, which is the start of the second stage of the search.

In this second stage, and as noted above, the control circuit 71 is searching for the minimum value of the AGC gain, which represents the maximum or peak value of the magnetic field. In this regard, the control circuit 71 will initially determine, beginning from the radial search position located by the first stage of the search, whether the magnetic field of the data is increasing in a radially inward direction, or in a radially outward direction. The search will then move continuously in either a radially inward direction or a radially outward direction, so long as the amplitude of the magnetic field continues to increase, in order to search for the maximum value. Of course, as discussed above, the control circuit 71 is actually monitoring the AGC gain factor, and is thus searching in the radial direction in which the average AGC is decreasing, until a minimum value is located.

In more detail, with reference to block 321, the control circuit sets a variable STEP VALUE to one-half of a servo track. It then selects a new search position by adding the value in STEP VALUE to the search position determined by the first stage of the search. The control circuit 71 then moves the read element 112 radially to this new search position, and effects a read. The control circuit determines the average AGC value for this search position in the manner discussed above, and then puts this average value in a variable AGC1. Control then proceeds to block 322.

The variables AGC0 and AGC1 contain respective AGC values which correspond to search positions that are spaced by one-half of a servo track. By comparing these AGC values, a determination can be made of the radial direction in which the AGC value is decreasing, which is the radial direction in which the magnetic field amplitude is increasing. Thus, in block 322, the values in AGC1 and AGC0 are compared. If the value in AGC1 is greater than the value in AGC0, it means that the radial search direction tentatively adopted in block 321 is wrong, and control proceeds to block 323, where the search direction is reversed. In particular, the value in STEP VALUE is changed to a negative one-half servo track, the search position is reset to the search position determined in the first stage of the search, and the AGC values stored in AGC0 and AGC1 are swapped. Control then proceeds to block 326. On the other hand, if it was determined in block 322 that the initial search direction was correct, block 323 is skipped, and control proceeds directly to block 326.

In block 326, the control circuit 71 adds the current value in STEP VALUE to the current search position, in order to determine a new search position. The control circuit 71 then moves the read element 112 to this new search position, and uses it to effect a read. The control circuit determines an average AGC value for this new search position in the manner discussed above, and stores this value in a variable AGC2. From this point on, the variable AGC2 will always contain the most recently determined average AGC, the variable AGC1 will contain the average AGC which was determined just before the average AGC in variable AGC2, and the variable AGC0 will contain the average AGC which was determined just before the average AGC in variable AGC1. The variables AGC2, AGC1 and AGC0 thus represent a form of sliding window, which contains the three most recent values of average AGC which have been determined during the search.

So long as the amplitude of the data continues to progressively increase, the average AGC values will progressively decrease, such that the value in AGC2 will be less than the value in AGC1, and the value in AGC1 will be less than the value in AGC0. However, as soon as the search position moves past the peak amplitude of the data, the data amplitude will decrease relative to the immediately preceding read, and the average AGC value will increase. Thus, during the second stage of the search, the control circuit 71 is effectively looking for a condition in which the AGC values in AGC2 and AGC0 are both greater than the AGC value in AGC1.

In block 327, a check is made for this condition, by comparing AGC2 and AGC1, in order to see if AGC2 is less than AGC1. If so, further searching is needed. Therefore, in block 328, the values in AGC1 and AGC2 are respectively moved to the variables to AGC0 and AGC1, and control returns to block 326 in order to determine a new value for AGC2. Eventually, however, it will be determined in block 327 that the value in AGC2 is greater than the value in AGC1, thereby indicating that the search has determined that the minimum value of AGC, which corresponds to the maximum value of the magnetic field of the data, is somewhere between the locations corresponding to the values in AGC0 and AGC2. Control then proceeds to block 331.

It will be recognized that, at this time, the peak of the magnetic field of the data is somewhere in the region of the search position corresponding to the average AGC value in AGC1. Accordingly, in block 331, the search position is moved backward by one step so that it corresponds to the position used to obtain the value in AGC1. Then, the control circuit 71 uses a curve fitting technique to fit a curve to the values in AGC0, AGC1 and AGC2, and carries out an interpolation in order to locate the point at which this curve has its minimum value. This point will be somewhere between the search positions corresponding to the average AGC values in AGC0 and AGC2, but may not be precisely at the search position corresponding to AGC1. In the disclosed embodiment, the curve fitting and interpolation are effected in a simple and efficient manner by simply solving the following equation, where PEAKPOS is the absolute position (in servo tracks) at which the write element 113 wrote the data which is the subject of the search:

$$PEAKPOS = \left(\frac{1}{2} \cdot \frac{AGC0 - AGC2}{AGC0 - 2AGC1 + AGC2} \cdot Step\right) + search\ position$$

The servo track at which the read element 112 was positioned when the data was written by the write element 113 is known, and is referred to here as TRACKPOS. PEAKPOS is the servo track position at which the read element would need to be positioned in order to read back that same data. It should be noted that TRACKPOS and the calculated value of PEAKPOS will usually not be integer values, but instead will each typically be a respective non-integer value which includes a whole track number and also a fraction of a track. The measured microjog distance $MJD_{meas}$ is the difference between TRACKPOS and PEAKPOS, or in other words:

$$MJD_{meas} = TRACKPOS - PEAKPOS$$

In the procedure described above with reference to the flowchart of FIG. 10, the control circuit 71 monitors the gain factor used by the AGC circuit 77. However, it would alternatively be possible for the control circuit to monitor some other characteristic of the channel signal 74 which is available from the channel circuit, such as the signal-to-noise ratio (SNR).

In FIG. 1 and the foregoing discussion, the reserved areas 36 and 37 respectively include the radially innermost and radially outermost tracks. However, it would alternatively be possible to move each of the reserved areas in a direction radially toward the other, so that the tracks in the reserved area 36 are not the radially innermost tracks, and the tracks in the reserved area 37 are not the radially outermost tracks. User data would then be stored not only in the region disposed radially between the reserved areas 36 and 37, but also in a region disposed radially inwardly of the reserved area 36, and a region disposed radially outwardly of the reserved area 37. The values of the coefficients b and c for Equation (6) would still be determined in the same manner discussed above.

The present invention provides a number of advantages. One such advantage is that a microjog value can be accurately calculated in a manner that accurately compensates for a number of real-world considerations which can affect the microjog value. This is especially advantageous in the context of a drive that accepts removable cartridges, where each drive must be able to reliably and accurately work with a plurality of the cartridges, and each cartridge must be able to reliably and accurately work with a plurality of the drives. It accommodates tolerance variations from cartridge to cartridge and from drive to drive, as well as seating variations which occur for different cartridges, or for different insertions of the same cartridge.

A further advantage is that the appropriate compensation is determined in a dynamic manner each time that a cartridge is inserted into a drive. Still another advantage results from the manner in which the compensation information is dynamically determined, which involves writing data at radially spaced locations on a disk, and searching for the data using a search technique that is configured to be rapid and efficient, while minimizing the number of seeks and reads that are typically needed to complete the search. Still another advantage is the speed and efficiency which results from use of a polynomial to determine a nominal or ideal microjog value.

Although one embodiment has been illustrated and described in detail, it will be understood that various substitutions and alterations are possible without departing from the spirit and scope of the present invention, as defined by the following claims.

What is claimed is:

1. An apparatus comprising a receiving unit having a receiving portion which can removably receive a cartridge, said receiving unit having a movably supported head with spaced read and write portions, said receiving unit being responsive to insertion into said receiving portion of a cartridge having an information storage medium for moving said head adjacent and relative to the storage medium while using said head to write selected information to the storage medium and to then read back said selected information in order to determine compensation information relating to said spacing between said read and write portions, said receiving unit subsequently effecting writing of information with said head as a function of said compensation information.

2. An apparatus according to claim 1, including a cartridge which can be removably inserted into said receiving portion of said receiving unit and which includes a rotatable information storage medium.

3. An apparatus according to claim 1, wherein said receiving unit effects said subsequent writing of information in a manner which includes converting a desired position for said write portion into a corresponding position for said read portion that compensates for said spacing between said read and write portions, and then positioning said read portion at said corresponding position while writing the information to said storage medium with said write portion.

4. An apparatus according to claim 1, wherein said receiving unit effects said subsequent writing of information by using a predetermined translation to determine a nominal position for said head, and by then using said compensation information to adjust said nominal position in order to determine an actual position for said head.

5. An apparatus according to claim 4, wherein said predetermined translation includes use of a predetermined polynomial.

6. An apparatus according to claim 4, wherein said compensation information includes a scaling value, said receiving unit multiplying said nominal position by said scaling value.

7. An apparatus according to claim 4, wherein said compensation information includes a scaling value and an offset value, said receiving unit multiplying said nominal position by said scaling value and then adding said offset value to the result of the multiplication.

8. An apparatus according to claim 4, wherein said compensation information includes an offset value, said receiving unit adding said offset value to a value which is a function of said nominal position.

9. An apparatus according to claim 1,
wherein said selected information includes first and second portions which are respectively written to and read from respective spaced locations on a storage medium in a cartridge; and
wherein said receiving unit determines said compensation information as a function of said first and second portions as read back with said head.

10. An apparatus according to claim 9,
wherein said compensation information includes a scaling value and an offset value; and
wherein said receiving unit effects said subsequent writing of information by using a predetermined translation to determine a nominal position for said head, by multiplying said nominal position by said scaling value, and by then adding said offset value to the result of the multiplication.

11. An apparatus according to claim 1, wherein said reading back of said selected information includes:
searching for a location of said selected information by effecting successive reads with said head in respective different search positions;
fitting a curve to a characteristic of said selected information as read in three of said search positions; and
treating one of a minimum and maximum of said curve as corresponding to the position of a center of said selected information.

12. An apparatus according to claim 11, wherein said characteristic of said selected information for the centermost of said three search positions is one of greater than and less than said characteristic of said selected information for each of the outermost of said three search positions.

13. An apparatus according to claim 11, wherein said receiving unit carries out said successive reads in successive first and second stages, the spacing between adjacent search positions of said head being larger in said first stage than in said second stage.

14. An apparatus according to claim 13, wherein said receiving unit carries out said first stage of said search until the occurrence of a read in which said characteristic of said selected information satisfies a specified criteria, and according to a search pattern in which said receiving unit effects a read with said head in a first of said selected positions and then effects successive said reads by alternately positioning said head on opposite sides of said first position with a progressively increasing distance from said first position.

15. An apparatus according to claim 13, wherein said receiving unit carries out said second stage of said search by effecting successive said reads while moving said head in a selected direction to successive said search positions, until the occurrence of a read in which the direction of change in said characteristic of said selected information between successive said reads undergoes a reversal, the most recent three search positions then being used as said three search positions on which said curve fitting is based.

16. A method of operating a receiving unit having a cartridge receiving portion and having a head with spaced read and write portions, said method including:
responding to insertion into said receiving portion of a cartridge having an information storage medium by moving said head adjacent and relative to the storage medium while using said head to write selected information to the storage medium and to then read back said selected information;
using the selected information as read back with said head to determine compensation information relating to said spacing between said read and write portions; and
subsequently effecting writing of information with said head as a function of said compensation information.

17. A method according to claim 16, including effecting said subsequent writing of information in a manner which includes converting a desired position for said write portion into a corresponding position for said read portion that compensates for said spacing between said read and writes portions, and then positioning said read portion at said corresponding position while writing information to said storage medium with said write portion.

18. A method according to claim 16, including effecting said subsequent writing of information by using a predetermined translation to determine a nominal position for said head, and by then using said compensation information to adjust said nominal position in order to determine an actual position for said head.

19. A method according to claim 18, wherein said using of said predetermined translation includes using a predetermined polynomial.

20. A method according to claim 18, including configuring said compensation information to include a scaling value, said using of said compensation information to adjust said nominal position including multiplying said nominal position by said scaling value.

21. A method according to claim 18, including configuring said compensation information to include a scaling value and an offset value, said using of said compensation information to adjust said nominal position including multiplying said nominal position by said scaling value and then adding said offset value to the result of the multiplication.

22. A method according to claim 18, including configuring said compensation information to include an offset value, said using of said compensation information to adjust said nominal position including adding said offset value to a value which is a function of said nominal position.

23. A method according to claim 16,
including configuring said selected information to include first and second portions which are respectively written to and read from respective spaced locations on a storage medium of a cartridge; and
wherein said receiving unit determines said compensation information as a function of said first and second portions as read back with said head.

24. A method according to claim 23,
including configuring said compensation information to include a scaling value and an offset value; and affecting said subsequent writing of information by using a predetermined translation to determine a nominal position for said head, by multiplying said nominal position by said scaling value, and by then adding said offset value to the result of the multiplication.

25. A method according to claim 16, wherein said reading back of said selected information includes:

searching for a location of said selected information by effecting successive reads with said head in respective different search positions;

fitting a curve to a characteristic of said selected information as read in three of said search positions; and treating one of a minimum and maximum of said curve as corresponding to the position of a center of said selected information.

26. A method according to claim 25, including selecting said three search positions so that said characteristic of said selected information for the centermost of said three search positions is one of greater than and less than said characteristic of said selected information for each of the outermost of said three search positions.

27. A method according to claim 25, including carrying out said successive reads in successive first and second stages, the spacing between adjacent search positions of said head being larger in said first stage than in said second stage.

28. A method according to claim 27, including carrying out said first stage of said search until the occurrence of a read in which said characteristic of said selected information satisfies a specified criteria, and according to a search pattern which includes effecting a read with said head in a first of said selected positions and then effecting successive said reads by alternately positioning said head on opposite sides of said first position with a progressively increasing distance from said first position.

29. A method according to claim 27, including carrying out said second stage of said search by effecting successive said reads while moving said head in a selected direction to successive said search position, until the occurrence of a read in which the direction of change in said characteristic of said selected information between successive said reads undergoes a reversal, the most recent three search positions then being used as said three search positions on which said curve fitting is based.

* * * * *